Patented Sept. 5, 1933

1,925,548

UNITED STATES PATENT OFFICE 1,925,548

PROCESS FOR THE PRODUCTION AND MANUFACTURE OF EMULSIONS OF OXIDIZED DRYING OILS, VARNISHES, AND LACQUERS

Paul Christiaan van der Willigen, Krommenie, Netherlands

No Drawing. Application June 10, 1929, Serial No. 369,937, and in the Netherlands November 6, 1928

5 Claims. (Cl. 134—1)

This invention relates to a process for the production and manufacture of emulsions of oxidized drying oils, varnishes and lacquers.

It has already been proposed to prepare linoxyn or similar oxidation products of drying oils by emulsifying linseed oil in water and by passing air or oxygen through this emulsion. The linoxyn obtained in this way separates in floccular form, which flocks deposit and are removed by filtration. It has also been suggested to modify this process by adding protective colloids, such as joiner's glue to prevent formation of bigger flocks, so that the oxidation product is deposited as fine flocks.

This invention relates to a process for the production of emulsions of oxidized drying oils, varnishes and lacquers, e. g. an emulsion of linoxyn, in which the oxidation product is consequently not separated, but remains in colloidal solution.

Emulsions of oxidized drying oils are as yet unknown. By these emulsions quite novel fields of application become possible. In this respect I mention the possibility of making superfluous the costly mixing and kneading machines in the manufacture of linoleum by utilization of said emulsions of oxidized drying oils and lacquers. Another possibility of applying these emulsions is their use in rapidly drying paints. The water of these emulsions will rapidly disappear by virtue of the porosity of the underground and by evaporation, after which the oxidized oil with the paints, which have previously been added to the emulsion in aqueous suspended state (occasionally with the addition of emulsifiers) stays behind as a dry coat. The emulsion may also be used for joining purposes and for waterproofing. Generally spoken emulsions of oxidized drying oils or lacquers may be utilized in all those cases, where latex or on the other hand asphalt emulsions were utilized up to this time.

According to the invention an emulsion of drying oils, varnishes or lacquers is oxidized under such conditions, that a stable emulsion of oxidized drying oils, varnishes or lacquers is obtained.

As a result of a thorough investigation into the causes of flocculation it was found that the deposit of fine flocks of the oxidized oils, varnishes and lacquers on the bottom of the container is mainly due to the formation of acids, such as formic acid, acetic acid and the like during the oxidation of these oils, varnishes or lacquers, which acids have a coagulating action on the emulsion.

According to the invention a stable emulsion of oxidized drying oils, varnishes or lacquers is obtained by taking care during the oxidation that the acids formed do not exercise a coagulating action. This may for example be effected by adding at intervals, e. g. of an hour, such a quantity of a base or of ammonia, that the value of the hydrogen-ions-exponent (pH) is approximately constant or at all events does not fall below about 7. It has been found that the required total amount of the base or of the ammonia should in most cases not be added directly in the beginning, since this might prevent the formation of a stable emulsion to start with and moreover the high degree of saponification would be a disadvantage. Evidently the reaction may not be kept alkaline by the addition of such substances, such as lime, as calcium-ions exercise a coagulating action, just as hydrogen ions.

According to the invention it is also possible to utilize the buffering action of salts or strong bases and weak acids, such as e. g. soaps or soda, potash, ammonium carbonate, etc. by simple adding an excess of these salts in the beginning, of which a part gives rise to the emulsifier for the drying oil, varnish or lacquer. The acids formed during the oxidation are bound, whereas the liberated higher fatty acids or carbonic acid do not exercise any coagulating action, since they split off no or only very few hydrogen ions. In the event of an insufficient excess of buffering salts in the beginning, it is also possible in this case to add some base or ammonia during the oxidation. Further I have found that the emulsion is obtained easier and quicker in a definite region of temperature. Increase of temperature accelerates the progress of the reaction, but too high a temperature appeared to be disadvantageous, for the formation of the emulsion of the oxidized oil, varnish or lacquer. A temperature lying between 30 and 70° C. proved to be very suitable.

By increase of pressure the reaction is also accelerated.

The oxidation may be effected for example by blowing air or oxygen, preferably in finely divided state into the emulsion of the drying oils, varnishes or lacquers or by squirting up this emulsion in gases containing oxygen.

The invention will be illustrated by the following examples, but it is emphasized that it is not restricted thereto.

1. 150 kg. of tung oil with siccatives are emulsified by means of 1000 kg. of a solution of soap (approximately 0.2 normal). This emulsion is kept at about 50° C. and finely divided air is led through during about 24 hours. A strong formation of foam occurs during this reaction. The reaction being finished a very stable emulsion of oxidized tung oil is obtained with a particle size which is smaller than about 1 μ.

2. 150 kg. of lacquer, being composed of: 125 kg. of boiled oil (linseed oil with siccatives), 20 kg. of resin, 5 kg. of Kauri copal, are emulsified in 850 kg. of a 0.3 N. soda solution by simply blowing gas through the mixture, whereby emulsification takes place. Oxygen in finely divided state is then led through at about 50° C. during 12 hours. The oil is then completely oxidized. An emulsion of "linoleum cement" is obtained which can be employed directly in the linoleum industry.

3. Instead of emulsifying the above mentioned lacquer in a solution of soda I may emulsify it in a solution of a base of 0.1 normality and adding every hour so much of a 0.1 N. base, that the reaction does not become acid. For the rest I proceed as in the example given above.

Though water or aqueous solutions have been mentioned as the medium, it will be readily understood, that any other suitable solvent or solution may be employed.

Having now described my invention, what I claim as new and desire to secure by Letters Patent is:

1. The process of making an aqueous emulsion containing oxidized drying-oils and the like, comprising forming a colloidal aqueous emulsion of the oil, oxidizing this emulsion, and keeping the oxidized oil particles in an emulsified, non-flocculent, non-gelling state of particle fineness not greater than 1 μ, by preventing, during oxidation, the emulsion from reacting acid.

2. The process of making an emulsion of oxidized drying-oils and the like, comprising forming a colloidal aqueous emulsion of the oil, oxidizing this emulsion, and keeping the oxidizing oil particles in an emulsified, non-flocculent, non-gelling state by adding an excess of an alkaline substance to the water before oxidation.

3. The process of making an emulsion of oxidized drying-oils and the like, comprising forming a colloidal aqueous emulsion of the oil, oxidizing this emulsion, and keeping the oxidizing oil particles in an emulsified, non-flocculent, non-gelling state by adding a part of the total required quantity of an alkaline substance before oxidation and adding the rest in equal portions during oxidation.

4. The process of making an emulsion of oxidized drying-oils and the like, comprising forming a colloidal aqueous emulsion of the oil, oxidizing this emulsion, and keeping the oxidized oil particles in an emulsified, non-flocculent, non-gelling state by adding an excess of a saponaceous substance in a quantity sufficient to keep the hydrogen-ion exponent always not less than 7.

5. The process of making an emulsion of oxidized drying-oils and the like, comprising forming a colloidal aqueous emulsion of the oil, oxidizing this emulsion, and keeping the oxidized oil particles in an emulsified, non-flocculent, non-gelling state by adding an excess of a salt of a weak acid and a strong base, e. g. soda, in a quantity sufficient to keep the hydrogen-ion exponent always not less than 7.

PAUL CHRISTIAAN van der WILLIGEN.